United States Patent Office
3,534,998
Patented Oct. 20, 1970

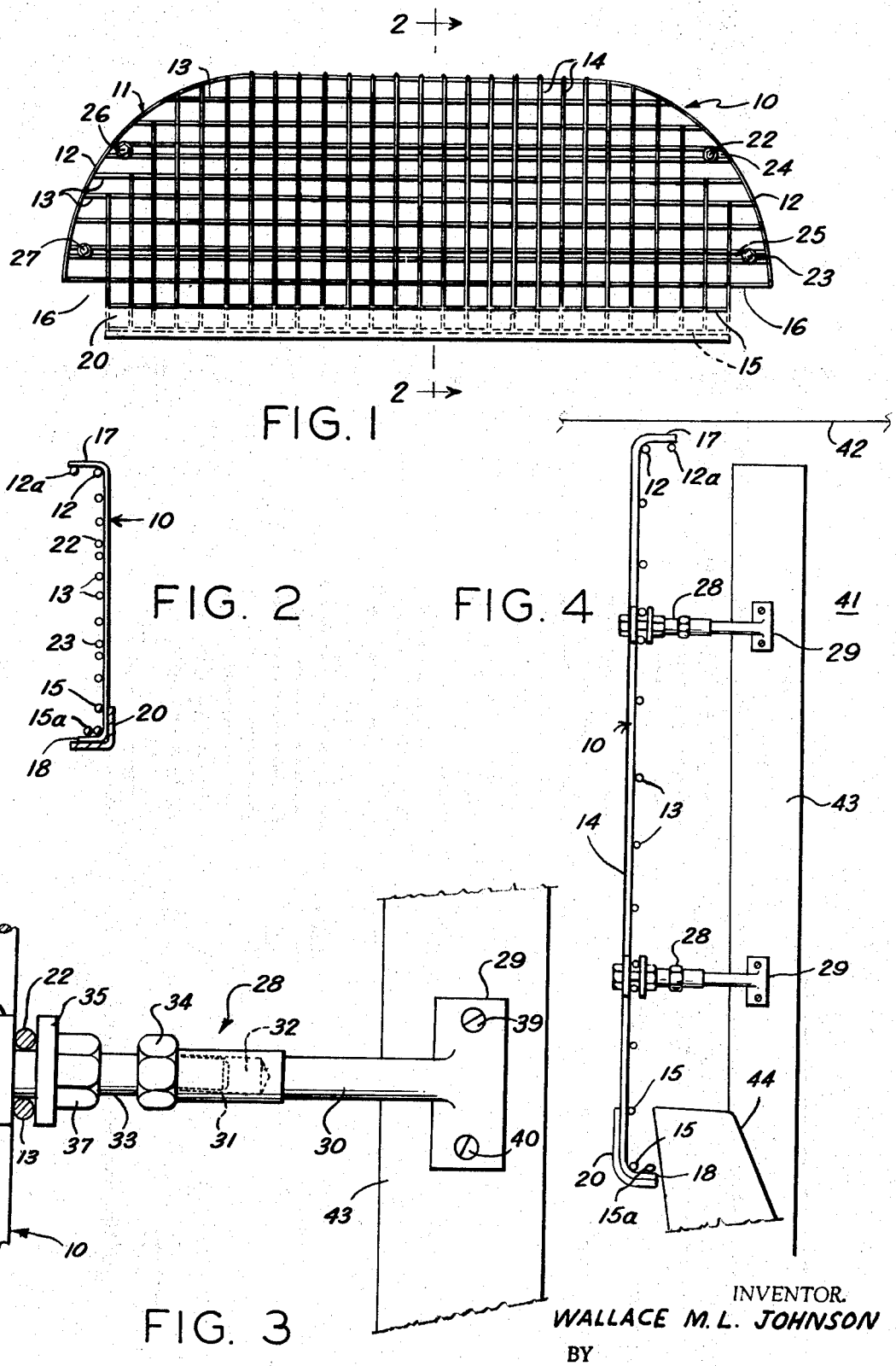

3,534,998
PROTECTIVE BARRIER FOR AUTOMOBILES
Wallace M. L. Johnson, 1 Waldon Lane,
St. Paul, Minn. 55112
Filed Nov. 20, 1968, Ser. No. 777,230
Int. Cl. B60r 27/00
U.S. Cl. 296—24      8 Claims

ABSTRACT OF THE DISCLOSURE

A protective barrier for separating the interior of an automobile into fore and aft sections made from a grid work of horizontal and vertical wires. Two vertically spaced pairs of horizontal wires are more closely spaced to each other than the remainder of said horizontal wires thereby providing for a plurality of horizontally extending vertically spaced slots. Adjustable brackets are provided to cooperate with said slots and to thereby firmly attach the barrier to the doorposts of the automobile.

---

The invention relates to a vehicle partition and particularly pertains to a screen for defining a compartment within station wagons and passenger cars. The invention is particularly useful for automobiles used by law enforcement agencies, taxies, fleets of service wagons and personal automobiles.

One object of the invention is to provide a vehicle partition which may be installed in a vehicle with little modification to the vehicle and which will not affect the visibility within the vehicle.

Another object of the invention is to provide a barrier capable of confining an object to one section of an automobile, including station wagons and compact automobiles, and which can be quickly installed or removed.

Another object is to provide a barrier having a special utility in the transporting of animals from place to place, because a barrier of the envisaged type allows constant observation of the animal by the driver and in no way prevents light and air being furnished to the animal.

Another object of the invention is to provide a barrier which will be firmly anchored during use, thereby resisting dislodgement even when relatively massive objects are thrown thereagainst such as when the driver is forced to stop suddenly.

Yet another object of the invention is to provide a barrier designed to protect the driver and passengers from assaults, robberies and flying objects.

A further object of the invention is to provide a barrier for an automobile which is sufficiently strong to provide the required protection and yet is sufficiently light in order to be easily installed and/or removed.

A still further object of the invention is to provide a barrier for an automobile designed in such a manner as to give full protection to the interior upholstery of the automobile.

These and ohter objects and advantages of my invention will more fully appear from the following description, made in connection with the accompanying drawings, wherein like reference characters refer to the same or similar parts throughout the several views and in which:

FIG. 1 is an elevational view of my barrier;

FIG. 2 is a sectional view taken in the direction of line 2—2 of FIG. 1;

FIG. 3 is a detailed view of one of the brackets used to support my barrier inside the automobile; and FIG. 4 is a schematic view of my barrier when installed in an automobile.

AS SHOWN ON THE DRAWINGS

From FIG. 1 it will be seen that the barrier exemplifying my invention has been generally denoted by the reference numeral 10. The barrier 10 includes a panel 11 comprised of an upwardly bowed wire 12. Offset slightly forwardly of the straight, central portion of the wire 12 is a straight wire 12a that imparts rigidity to the panel 11 as will presently become apparent. Various horizontal wires 13 are attached to the curved wire 12, such as by brazing or welding. Secured to the horizontal wires 13 are vertically extending wires 14 which, together with the wires 13, from the lattice work or mesh appearance clearly discernible in FIG. 1. It will be noted, however, that the two lowermost horizontal wires 15 are somewhat shorter than the wires 13 thereabove thereby providing a notch 16 at each of the lower corners of the panel. The notches 16 obviate any chance of interference such as where the fenders of a station wagon extend upwardly to a considerable height within the confines of the vehicle and jut inwardly at such a height.

As shown in FIG. 2, those vertically arranged wires 14, located intermediate the ends of the straight horizontal wire 12a are bent forwardly (away from the viewer in FIG. 1) at their upper end portions for a short distance thereby providing horizontal portions 17 (FIGS. 2 and 4) spaced along the full length of the horizontal wire 12a of the barrier.

All of the vertically extending wires 14 have their lower end portions 18 bent forwardly, as shown in FIGS. 2 and 4. A straight wire 15a having a length corresponding to the wires 15 is secured in an offset forwardly relation with respect to the lower wire 15. The lower edge of the panel 11 is additionally strengthened by an L-shaped strip of sheet metal 20.

The end portions 17 and 18, which project perpendicularly from the general plane of the panel 11, add considerably structural strength to the grid work in that they substantially increase the moment of inertia of the grid work insofar as bending of the grid work in a horizontal as well as vertical direction is concerned. Additionally, the L-shaped sheet metal member 20 functions as a shield to provide protection for the seat upholstery.

As further shown in FIG. 1, the barrier of my invention also provides for easy attachment to the interior of the automobile. As shown in FIG. 1, I have provided for two additional horizontally extending wires 22 and 23 which are closely spaced from the previously mentioned horizontal wires 13. The wires 22 and 23 with their corresponding wires 13 provide for a plurality of slots 24, 25, 26 and 27 in the upper and lower left-hand and right-hand portions of the barrier respectively. A fastening bracket, the details of which will be discussed hereinbelow, may be adjustably mounted in each of the aforementioned slots whereby the barrier may be attached to the interior of the automobile.

As shown in FIG. 3, the brackets illustratively used to fasten the barrier to the interior of the automobile are generally indicated by the numeral 28 and each of the four brackets needed comprises a bracket plate 29 with which a rod-like member or shank 30 is integral. Attached to the other end of the member 30 is a hollow member 31 having a somewhat larger diameter and having a threaded hole 32 extending therein for approximately its entire length. An exteriorly threaded bolt 33 is screwed into the member 31 and may be held in any desired position by a nut 34. The bolt 33 is adapted to extend through the slots 24, 25, 26 and 27 of the barrier 10 and for purposes of illustration in FIG. 3 the bolt 33 is shown as extending between the horizontal wire 22 and the horizontal wire 13 of either slot 24 or 26. Two washers 35 and 36 are mounted on the bolt on either side of the wires 22 and 13 and nuts 37 and 38 cooperate with the washers 35 and 36 to firmly clamp the bolt 33 with respect to the wires 22 and 13 thereby detachably securing the barrier 10 to the bracket member 28. The bracket plate 29 may be firmly secured to the doorpost of the vehicle by means of screws 39 and 40. The position of the barrier member 10 with respect to the doorpost may be altered by loosening the nuts 34, 37 and 38, and by screwing the bolt 33 farther into or out of the interiorly threaded member 31. In this manner interior adjustment of my barrier is easily accomplished.

For the purpose of illustrating the use of the barrier 10, a portion of the interior of an automobile 41 has been pictured in FIG. 4. The automobile, quite obviously, includes a roof which has been labeled 42, a doorpost which has been labeled 43 and a seat, this having been designated by the reference numeral 44. These parts are pictured only in a general way, since they will differ somewhat depending upon the model of vehicle. Likewise, the bracket 28, especially as to its plate 28 and length of shank 30, can be designed to fit various model groups where necessary. Actual experience has shown, though, that only several types of brackets 28 are necessary.

Having presented the foregoing information, the manner in which my barrier is employed should be readily apparent. When it is to be installed, the user attaches the designated brackets 28 to the upper and lower adjustment slots 24, 26 and 25 and 27 on the left and right side of the barrier using the bolts 33, the washers 35 and 36 and the nut 37. The user then adjusts the overall length of the bracket 28 by adjusting nut 34 and turning the rod or shank 30 until the bracket plate 29 is in the desired position with respect to the doorpost 43. He then drills through the top holes (the ones receiving the screws 39) of each of the four bracket plates into the center of the doorpost and inserts the screws 39 thereby attaching the bracket plate firmly to the doorpost. He then checks the barrier member for straightness and vertical position and drills through the lower holes (those for the screws 40) in each of the four brackets after which he inserts the screws into the remaining holes. If necessary, he may further adjust the horizontal position of the barrier member by means of the nut 34 and bolt 33 after which all nuts are securely fastened whereupon the installation is completed.

The lower edge of the barrier 10 will be preferably positioned immediately behind the seat 44, as shown in FIG. 4, and thus if an animal or sizable object is thrown against the barrier 10 such as when the driver is compelled to stop the vehicle suddenly for a traffic situation, the seat 44 assists in absorbing the thrust. By the same token, when the barrier 10 is installed in a law enforcement vehicle, a person under arrest in the rear is precluded from reaching the officer-driver in the front. The mounting brackets 28 are of sufficient strength to absorb an impact and the barrier itself is of rigid construction and has been reinforced by turned over top and bottom edges as previously described.

In view of what has herein been stated, it will be recognized that the barrier 10 when installed serves very effectively to separate the interior of a vehicle, thereby permitting a dog or other animal, as well as miscellaneous items to be safely transported in the rear section of an automobile. In general, the barrier 10 has been devised with the thought that it will be usable in all types of vehicles, as hereinbefore mentioned.

It will, of course, be understood that various changes may be made in the form, details, arrangements and proportions of the parts without departing from the scope of my invention as set forth in the appended claims.

What is claimed is:

1. A barrier for separating the interior of an automobile into fore and aft sections comprising a panel including an upwardly bowed wire constituting the upper edge thereof and additional intersecting horizontal and vertical wires forming the remainder of the panel, the upper ends of said vertical wires being secured to said upwardly bowed wire and also to said horizontal wires, two vertically spaced pairs of said horizontal wires being more closely spaced to each other than the other of said horizontal wires thereby providing a pair of horizontally extending vertically spaced slots at each end of said panel, and bracket means extending into said slots for securely fastening said barrier to the interior of said automobile.

2. A barrier in accordance with claim 1 in which said bracket means includes a bracket member for each of said slots adapted to be secured at one end to the interior doorpost of the automobile, and said bracket means including additional means extending from each of said bracket members into each slot for firmly attaching said barrier to the interior of said automobile.

3. A barrier in accordance with claim 1 in which said bracket means comprises a bracket plate adapted to be secured to the interior doorpost of the automobile, a shank extending from said bracket plate and having its free end portion interiorly threaded, a bolt threaded into said shank, a first nut associated with said bolt for determining the extent to which said bolt is threaded into said shank, and a pair of nuts and a pair of washers associated with said bolt and cooperating with said slots in said barrier for firmly attaching said barrier to said bracket means and to the interior of said automobile.

4. A barrier in accordance with claim 1 in which each of said slots is longer than the spacing between said vertical wires.

5. A barrier in accordance with claim 4 in which said two paris of horizontal wires are on the same side of said panel.

6. A barrier in accordance with claim 1 in which the lowermost end portion of said vertical wires are bent in a direction perpendicular to the plane of the barrier thereby increasing the structural strength of said barrier.

7. A barrier in accordance with claim 6 in which an L-shaped protective shield is wrapped around the bent lowermost end portions of said vertical wires, said shield extending substantially the full width of said barrier.

8. A barrier in accordance with claim 6 in which the upper end portions of said vertical wires are bent in a direction perpendicular to the plane of the barrier thereby additionally increasing the structural strength of said barrier.

References Cited

UNITED STATES PATENTS

| 2,565,997 | 8/1951 | Stone | 105—369 |
|---|---|---|---|
| 2,864,648 | 12/1958 | Bland | 296—106 |
| 2,865,670 | 12/1958 | Dunn | 296—85 |
| 3,044,800 | 7/1962 | Wicker | 296—24 XR |
| 3,190,687 | 6/1965 | Johnson | 296—24 |

BENJAMIN HERSH, Primary Examiner

L. J. PAPENER, Assistant Examiner

U.S. Cl. X.R.

49—57; 280—150